(No Model.)  7 Sheets—Sheet 1.

W. McK. JENNE.
TYPE WRITING MACHINE

No. 548,553. Patented Oct. 22, 1895.

Witnesses:
James F. DuHamel
William H. Shipley

Inventor:
William McK. Jenne,
by Dodge & Sons,
his Attys.

(No Model.) 7 Sheets—Sheet 2.
W. McK. JENNE.
TYPE WRITING MACHINE.
No. 548,553. Patented Oct. 22, 1895.
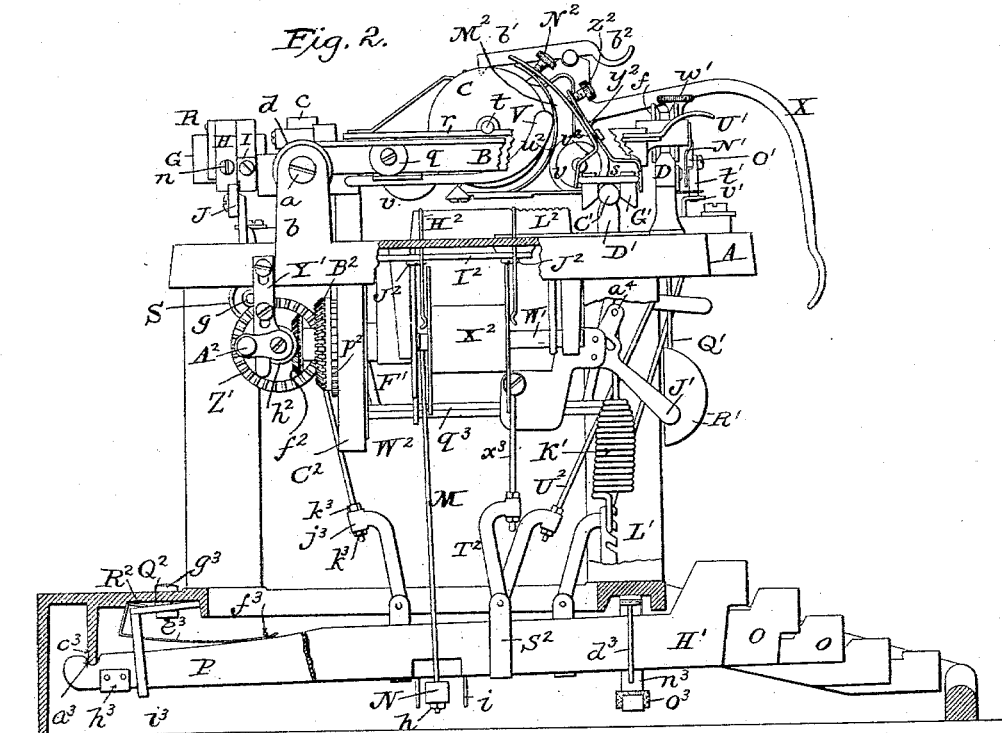
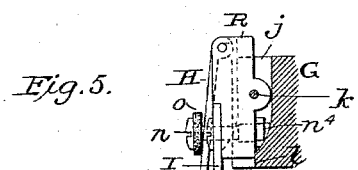
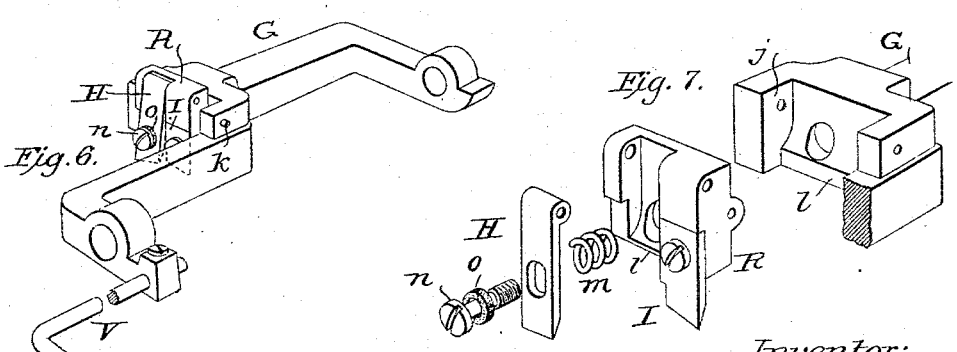
Witnesses:
James F. DuHamel
William H. Shipley
Inventor:
William McK. Jenne,
by Dodge Sons,
his Attys.

(No Model.) 7 Sheets—Sheet 3.
W. McK. JENNE.
TYPE WRITING MACHINE.
No. 548,553. Patented Oct. 22, 1895.
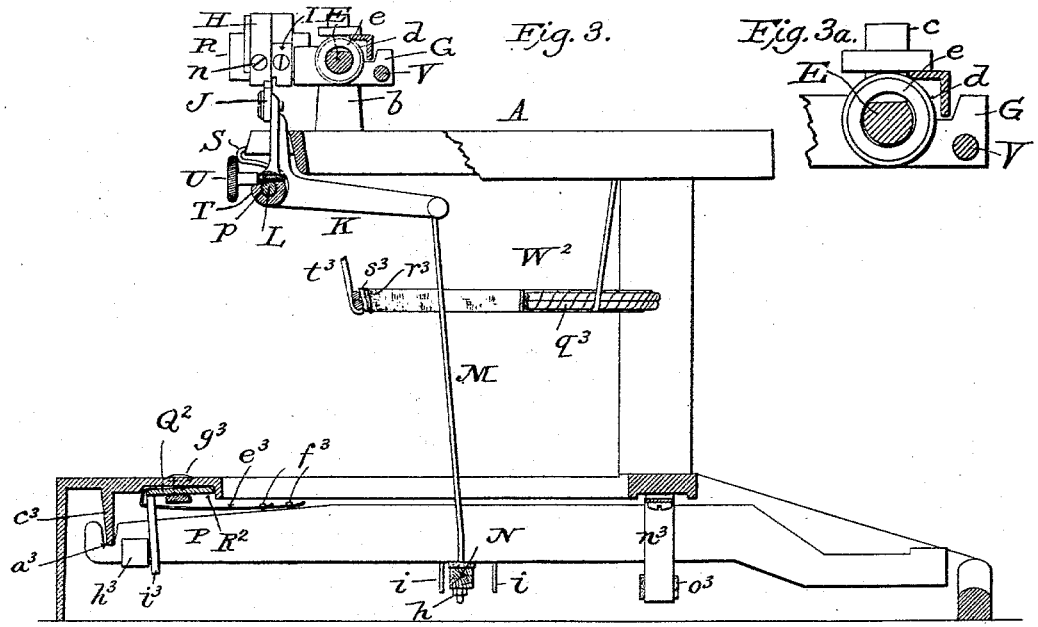
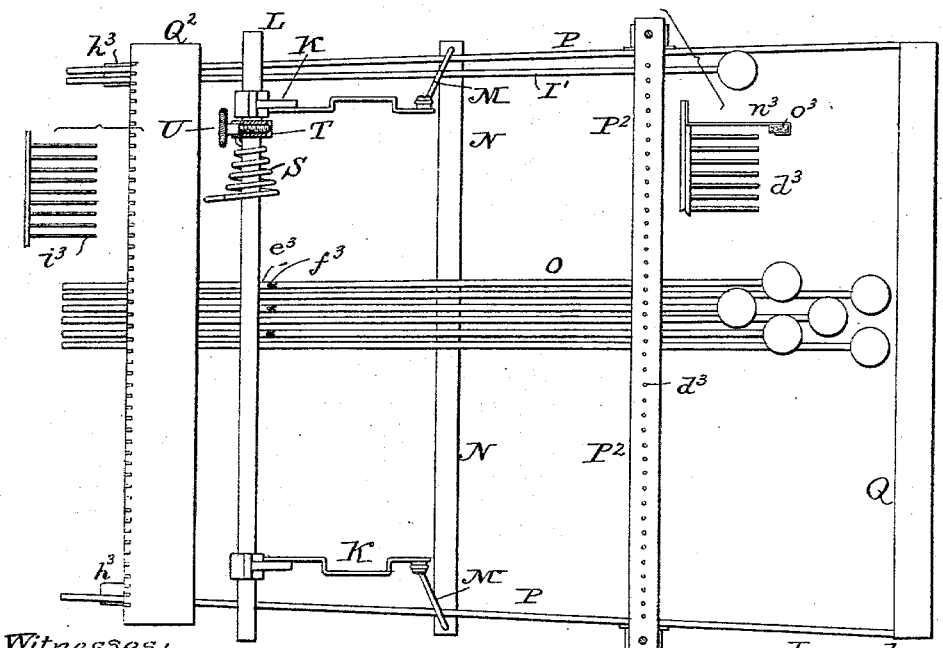
Witnesses:
James F. DuHamel
William H. Shipley
Inventor:
William McK. Jenne
by Dodge & Sons,
his Attys.

(No Model.) 7 Sheets—Sheet 4.

W. McK. JENNE.
TYPE WRITING MACHINE.

No. 548,553. Patented Oct. 22, 1895.

Witnesses:
James F. DuHamel
William H. Shipley

Inventor:
William McK. Jenne,
by Dodge Sons,
His Attys.

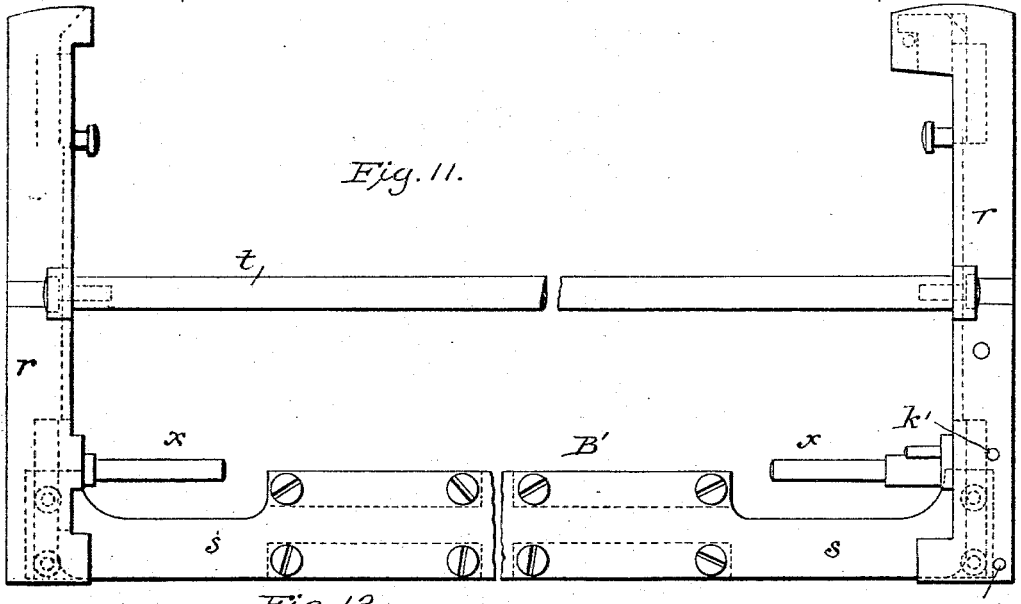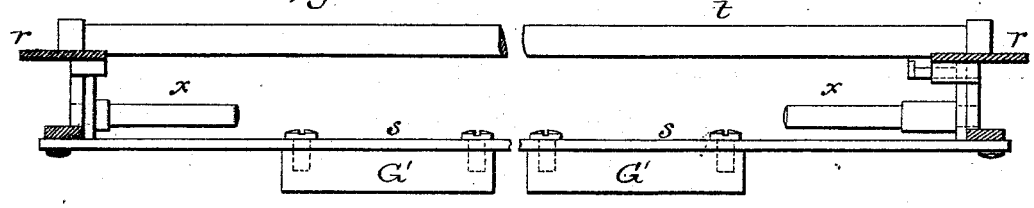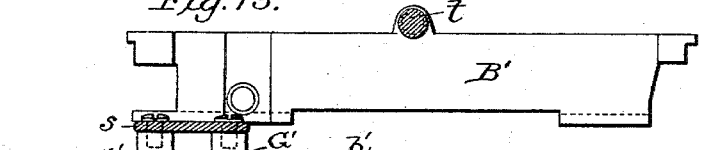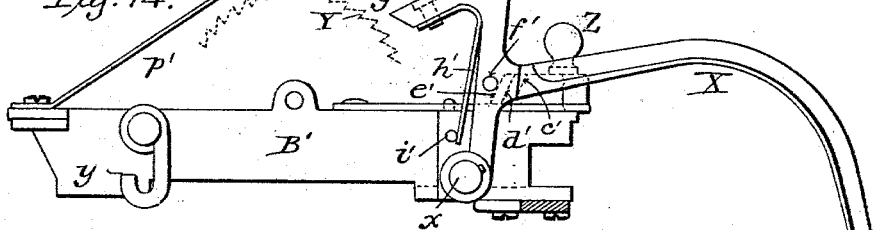

(No Model.) 7 Sheets—Sheet 6.

W. McK. JENNE.
TYPE WRITING MACHINE.

No. 548,553. Patented Oct. 22, 1895.

Witnesses:
James F. Duhamel
William H. Shipley

Inventor:
William McK. Jenne,
by Dodge & Sons,
his Attys.

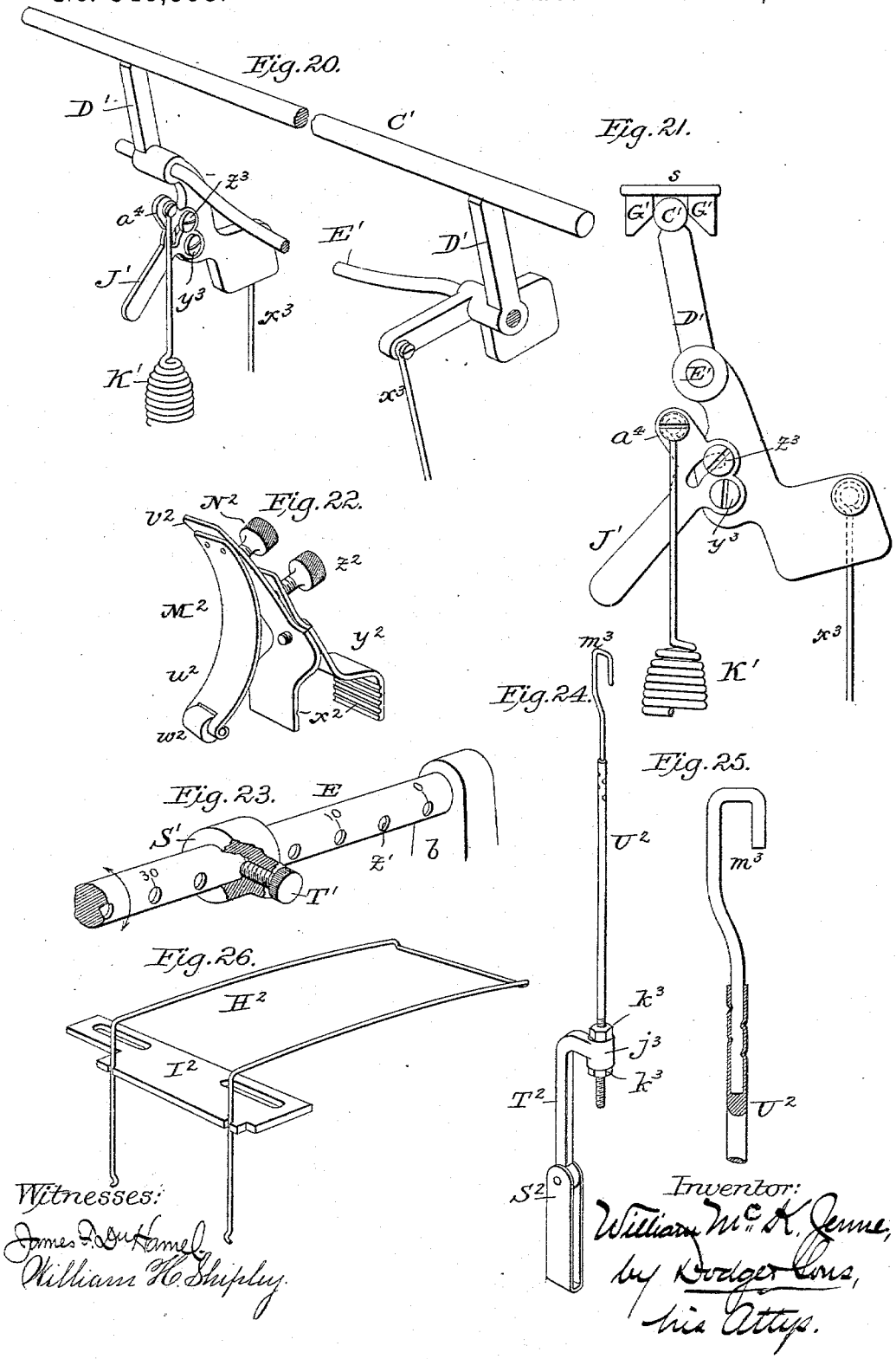

United States Patent Office.

WILLIAM McKENDREE JENNE, OF ILION, NEW YORK, ASSIGNOR, BY MESNE ASSIGNMENTS, TO THE WYCKOFF, SEAMANS & BENEDICT, OF NEW YORK.

TYPE-WRITING MACHINE.

SPECIFICATION forming part of Letters Patent No. 548,553, dated October 22, 1895.

Application filed January 20, 1888. Serial No. 261,408. (No model.) Patented in England May 16, 1888, No. 7,269.

*To all whom it may concern:*

Be it known that I, WILLIAM MCKENDREE JENNE, of Ilion, in the county of Herkimer and State of New York, have invented certain new and useful Improvements in Type-Writing Machines, (for which Letters Patent of Great Britain were granted, bearing date May 16, 1888, No. 7,269,) of which the following is a specification.

This invention relates to that class of type-writing machines in which a series of type bars or levers, each bearing two type or printing characters, are arranged in a circular series and caused to strike at one or the other of two points, the paper-sustaining roll or platen being shifted to receive the blow of one or the other of the type, as required.

The invention relates to the various parts of the machine, and is designed to improve the action of its various parts with a view to rendering its work more exact, to lessen the play and wear of parts, to decrease the power required to operate the machine, to facilitate adjustment, renewal, or repair of parts, and generally to perfect those parts which have in practical use of the machine been found susceptible of improvement.

Figure 1:
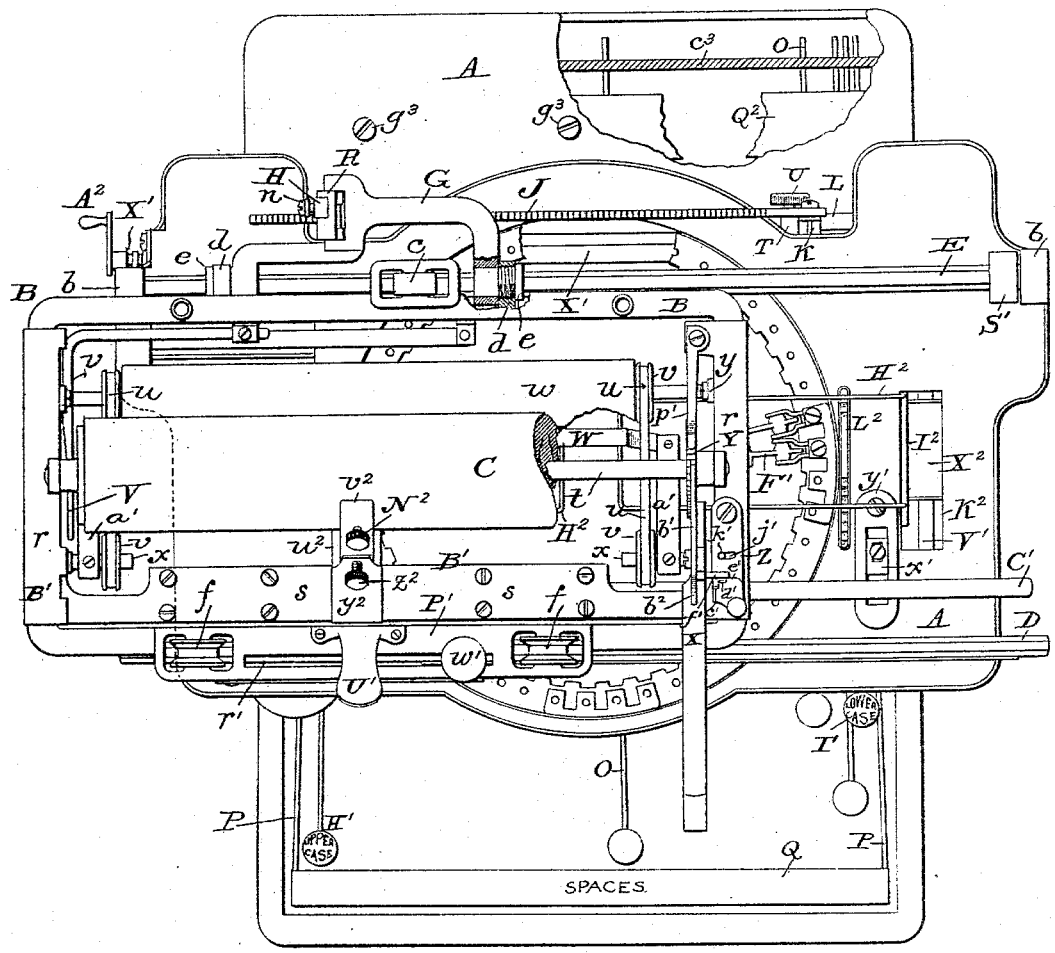

Referring to the accompanying drawings, Figure 1 is a top plan view of a machine embodying my improvements; Fig. 2, a side elevation of the same partially broken away to show parts hidden by the main frame; Figs. 3 to 27, inclusive, detail views of various parts hereinafter explained.

A indicates the main frame of the machine, which is of usual form, and B B' the traveling carriage, which is movable as a whole from side to side upon frame A, and the roller frame or part B' of which is capable of being shifted backward and forward upon the main carriage B to bring the roller or platen C over one or the other of the two printing characters with which each type-bar is furnished.

The carriage B is guided in its travel back and forth by two rods or bars D and E, Figs. 1, 2, and 3, the former secured rigidly to posts or standards rising from the top of frame A at or near its front and the latter being tapped at its ends to receive screws $a$, which serve as journals for said rod, the screws passing through and their heads being seated in holes formed through uprights $b$ at or near the rear side of frame A. Rod E being thus supported is free to rock or turn and forms a hinge-rod for the carriage, permitting the latter to be raised to or thrown slightly back of a vertical position to expose to view the line being printed.

The bar E is of D-form in cross-section, as shown in Fig. 3, one face being planed off or otherwise removed from a previously-cylindrical rod, so as to form a flat bearing-face to receive a supporting-roller $c$, by which the rear side of the carriage B is sustained while in working position. The roller $c$ is carried in a yoke or small open frame cast integral with the rear bar of the carriage-frame, as seen in Fig. 1, and consequently tips with the carriage-frame as the latter is raised or lowered, and being maintained always in contact with rod or bar E it will be seen that said rod must turn in unison with the frame, which is the reason for arranging it to rock or turn in its supports.

As shown in Figs. 1, 2, and 3, the rear bar of frame B is furnished with two perforated lugs or ear $d$, which are tapped to receive tubular bushings $e$, preferably of brass or other alloy or metal, which, sliding upon the bar E, will give but little friction and wear but slightly. The bushings $e$ are of a length sufficient to reach through and project some distance beyond the ears $d$, the projecting portions forming pivots or hinge-pins for a tipping frame G, carrying feed-dogs H and I, which alternately engage with a vibrating rack-bar J and thus bring about the step-by-step advance of the carriage, the rack-bar being actuated through the depression of the finger-keys, as hereinafter explained.

The front guide-bar D is beveled or reduced in width at its upper edge and the front bar of carriage-frame B is furnished with two supporting and guiding rollers $f$, which are V-grooved to cause them to fit and travel upon the bar D without any play in the direction of their axes. Owing to this arrangement, the carriage B is prevented from moving toward or from the front of the machine, and the rear side of the carriage-frame being held at just the proper distance from the rear sup      rod or bar D by the roller $c$ it follows that if the bushings e are once adjusted to encircle without actually bearing upon rod D, as shown in Fig. 3ᵃ, they will continue thus out of contact so long as the guiding-rollers f rest upon bar D; but when the rollers are lifted from said bar, as in throwing up the carriage, the bushings will bear upon said rod and the frame and rod will move together. By thus relieving the hinge-rod of the duty of guiding the carriage and of all wear except that due to the flat-faced roller c resting upon its upper face the thrust of the shifting supplemental carriage is taken off the hinge-rod and the tendency to interfere with the nice adjustment and action of the spacing devices is overcome. The hinge-rod, instead of being worn at short intervals corresponding with the teeth of the rack-bar, remains smooth and its pivots unworn, and the movements of the carriage continue free and certain.

Heretofore the step-by-step advance of the carriage has been effected by means of two dogs, one rigid and the other yielding, carried by a vibrating or oscillating lever connected with a cross-bar extending across the machine beneath the key-levers, said dogs arranged to enter alternately into engagement with a rack attached to and movable with the carriage. Under the present plan this arrangement is reversed, the dogs being attached to and movable with the carriage, a change which, together with certain modifications of the dogs, greatly improves the spacing mechanism and renders the carriage capable of being drawn back to the starting-point without separating the dogs and rack-bar, and yet without injury to either.

Referring to Figs. 1 to 7, inclusive, the construction and arrangement of the spacing devices will be explained.

J indicates the rack-bar, which is formed with a series of equidistant teeth along its upper edge, and is carried by the upright arms of two elbow-levers K, which are made fast upon a common rod or shaft L, carried at its ends upon taper pivots g, Fig. 2, secured in lugs cast upon frame A. The pivots occasion but little friction and afford ready means of adjustment to compensate for wear, it being important to avoid any play of the rod or shaft upon the pivots other than the simple rocking action. The horizontal arms of the elbow-levers K are each provided with a stud at or near the outer end, upon which is hung a link or wire rod M, each rod extending downward to near the lower line of frame A, and threaded at the lower end to receive a nut h, by which to retain upon the rods or links a cross-bar N, through which the rods pass, as shown in Figs. 2, 3, and 4. Bar N passes beneath all the key-levers O and under the levers P which carry the spacing-bar or finger-piece Q for spacing between words, and is consequently depressed whenever any key or the space-bar is pressed down. It is held against moving toward the front or rear of the machine by means of pins i, projecting downward from the levers P of space-bar Q, as shown in Figs. 2 and 3.

The pivoted frame G, which carries the spacing-dogs H and I, as above mentioned, is limited as to its descent by engagement with carriage B, and has a recessed vertical face, as seen in Figs. 1, 3, 5, 6, and 7, extending directly over and at right angles to the rack-bar J, the side walls j of the recess being perforated to receive a pin k, which serves as a pivot for a block R, by which block the dogs H and I are carried, the dog H being pivotally and the dog I rigidly attached to said block. The face or wall of the recess in which the block R is pivoted, and the face of the block itself, immediately in rear of the pivoted dog H, are both cut away, as in Fig. 5, so as to leave only a narrow edge or surface l to form a bearing against which the block and the dog shall respectively bear and by which their backward movements shall be limited. The purpose of thus cutting away the stop-faces is to reduce to a minimum the surface upon which dust might lodge, it being apparent that any matter lodging between the dog and block, or between the block and frame G, would lessen their movement, and thereby lessen the advance of the carriage B. The pivot k of block R is considerably back of its medial line, so that the block naturally swings by its own gravity into contact with the bearing-face l of frame G. Dog H is likewise pivoted at or near its upper end to block R, but its lower end is urged away from its top face l by a light, but highly elastic, spring m, interposed between its rear face and the face of the block, a spring being necessary in order to give a quickness of action that is unattainable by gravity.

The play of dog H is regulated by a screw n, Figs. 1, 2, 3, 6, and 7, passing through a hole or slot in the dog and through the block R, its rear end being furnished with a jam-nut $n^4$, as shown in Fig. 5. Beneath the head of this screw is placed a washer o, against which the dog H bears when thrown forward, said washer being made of leather, rubber, or other material adapted to lessen noise or wear of the parts. By turning the screw in or out the play of the dog may be regulated as desired.

Rack-bar J is thrown and normally held back to the limit of its vibration and in line with yielding dog H by means of a spring S, Figs. 3 and 4, which is preferably made in the form of a spiral coil, and one end of which is caused to engage with frame A or other fixed part of the machine, while the other end is attached to a collar T, encircling rod L and adjustable about said rod by means of a thumb-screw U, turning loosely in the collar and engaging with worm-teeth p, cut in or upon the rod L, as shown in Fig. 3. By turning the screw to the right or left the collar may be turned about the rod and the tension of the spring varied, as desired. The carriage being drawn forward by a spring, as usual, it follows that wherever a key-lever or the space-bar is depressed the rack-bar J is thrown forward out of the path of yielding dog H, which instantly springs forward the distance of one tooth, at which point it is stopped by screw $n$, the force of the carriage-advancing spring serving to overcome the light spring $m$, and consequently holding dog H in alignment with dog I so long as the rack is in its normal position and the dog H is in engagement therewith. It therefore follows that as the rack is thrown forward into the path of the dog I said dog engages with the tooth of the rack just passing out of engagement with dog H, and thereby prevents the carriage from moving forward; but as the pressure is removed from the key-lever or space-bar the rack swings back out of engagement with rigid dog I and its next tooth engages with the pivoted dog H. The propelling-spring of the carriage then overcoming the slight resistance of spring $m$ advances the carriage until the block R bears against the rear face of dog H, and the two dogs are thus again brought into alignment, the advance being the distance from one tooth of the rack to another, as usual.

The movement of pivoted dog H about its pivot in block R is not and cannot conveniently be made sufficient to permit the dog to rise clear of the rack J when moving the carriage back to the starting-point. Hence the necessity of the pivoted block R, which by yielding adds sufficiently to the movement of dog H to enable it to ride freely over the rack-teeth. In order, however, to enable the operator to lift the dogs entirely clear of the rack-bar J, and thus to avoid even the slight wear that might result from drawing back the carriage and permitting the dog H to drag over the teeth of the rack-bar, I provide the dog-frame G with a lever V, Figs. 1, 2, and 6, which extends forward toward the front of the machine and is bent upward within easy reach of the operator, preferably at the left hand of the platen or roller C.

Referring now to Figs. 1 and 2 and Figs. 11 to 21, inclusive, the details of carriage B B' and the controlling devices thereof will be explained.

Figure 19:
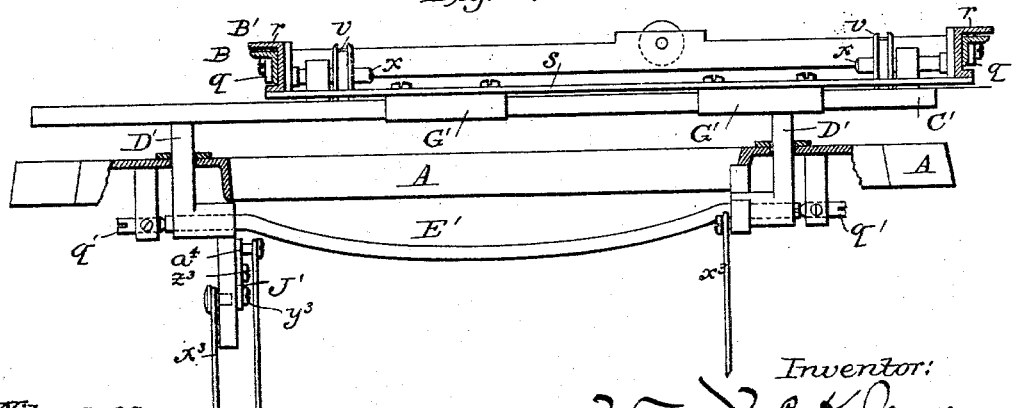

As already mentioned, carriage B is drawn forward by a spring and is moved back by hand for the commencement of a new line, and the supplemental carriage B' is made to shift toward and from the front of the machine to bring the paper over the capitals or the small letters of the type-bars. To permit this shifting to be readily effected and with slight expenditure of force, the main carriage B is provided at each end with two rollers $q$ $q$, upon which rest flanges of frame B', as shown in Figs. 2 and 19, other flanges along the lower side of the end bars of frame B' engaging beneath the end bars of frame B and thereby preventing the former from being lifted or from falling off the latter, as it might otherwise do in shifting the frame B' or in tipping up the carriage. The frame of the main carriage B being cast in one piece, it is necessary to apply the end bars $r$ of supplemental frame B' thereto before said end bars are finally joined together by the front bar $s$ and platen or roll shaft $t$, which, with the end bars $r$, make up the frame B'.

C indicates the platen or paper-sustaining roll, mounted upon the shaft or rod $t$ and free to turn thereon or therewith as said shaft is fixed or left free to turn, the former plan being ordinarily adopted.

The paper to be printed upon passes over a roller or cylinder $w$ in rear of the platen C, Fig. 1, thence beneath the platen and upward in front of the same, falling back over the same, as usual, and to keep the paper smooth and insure its even and uniform feeding throughout its width bands or belts $u$, preferably of rubber, are carried about grooved pulleys $v$ at the ends of roll $w$, thence beneath the platen C, and finally about grooved pulleys $v$ in front of platen C, the upper portion of the belt bearing against the paper and pressing it against the platen.

Prior to my invention the front pulleys $v$ were mounted upon a rod or shaft extending from one end bar of shifting frame B' to the other, a construction which necessitated the detachment of the rod before a worn or broken band could be renewed. This necessity I obviate by mounting the pulleys $v$ upon short stems $x$, projecting toward each other from the opposite end bars $r$ of the frame B', as shown in Figs. 1, 11, and 19. The side play of the pulleys is very slight, owing to the fact that the belts or bands $u$, which pass about them, pass also about the rear pulleys $v$, which have no side play. Hence there is no liability of the front pulleys $v$ to become dismounted, yet when necessary the bands may be readily slipped off the pulleys and over the ends of the stems $x$. The journals of roll $w$ are carried in hooks or hook-shaped hangers $y$, pivotally attached to the end bars $r$ of shifting frame B', as shown in Fig. 14, and hence said roll may be readily removed, as heretofore, and thus the ready and complete removal and replacement of the bands $u$ are permitted. The lower leaves of the bands $u$ are shielded by thin metal guards $z$, projecting from the supporting ends $a'$ of scale-plate W and having upturned leaves which prevent removal of the front pulleys $v$ from their studs $x'$, the arms $a'$ being carried by the stems $x$, Figs. 1, 17, 18, and 19.

W indicates the scale-plate of the platen, which is divided into spaces corresponding with the spacing of the teeth of rack-bar J, and numbered from "0" at the left to "70" at the right, in the present instance, though the rack-bars and carriages are made of different lengths in different machines, and the scales are of course made to correspond.

Heretofore the scale W has been of such shape that its ends and their supporting-arms $a'$ have been required to occupy a position between the upper and lower leaves of the bands $u$, thus rendering the application and removal of the bands difficult.

Figure 16:
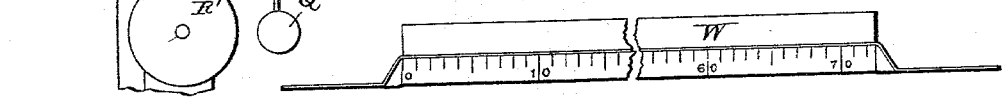
Figure 17:
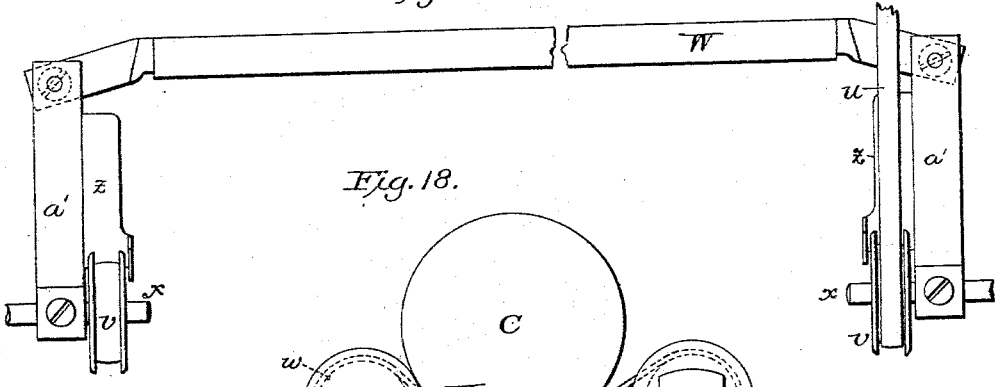
Figure 18:
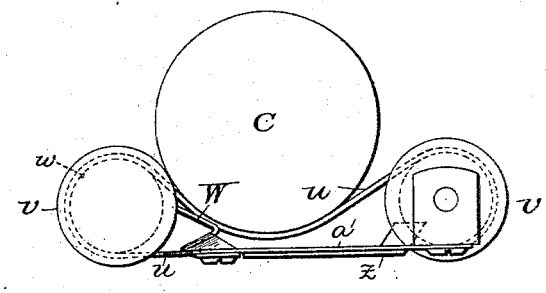

In the present machine the ends of the scale are twisted or bent, as shown in Figs. 16, 17, and 18, so that their flat faces stand at an angle of from thirty to forty-five degrees relatively to the face of the scale, the body of which is made of V shape in cross-section, one leaf extending upward from the arms $a'$ nearly to the face of the platen or roll C and the other following from that point more or less closely the face of the platen, as indicated in Fig. 18. By giving the scale this peculiar form it is adapted to pass wholly beneath the bands $u$, which may therefore be applied or removed with far greater ease than heretofore, though the graduated edge of the scale occupies its usual position in very close proximity to the face of the platen. The upper backwardly-turned leaf of the scale serves to support the paper and assist the bands $u$ in directing it beneath and around the platen. The paper being held by the bands $u$ closely against the platen C, which is ordinarily faced with rubber, is advanced after the completion of a line by a short partial rotation of the platen or roll C, which is effected by a hand-lever X, pivoted upon one of the stems $x$ of the shifting carriage B$'$, as shown in Figs. 1, 2, and 14, and carrying a dog $b'$, which engages with the teeth of a ratchet-wheel Y, secured upon the end of the platen-roll C.

It is desirable to be able to vary the line-spacing for different kinds of work, in some cases placing them very close together, in others giving them about the spacing of ordinary legal-cap paper, and again placing them still farther apart. To provide for such variation and insure precisely the spacing desired, I employ stop-plate Z, Figs. 1 and 14, having three shoulders $c'$, $d'$, and $e'$ and pivoted at one end to the horizontal top face of shifting frame B$'$ in position to engage and limit the motion of a stud or pin $f'$, projecting from the side of lever X above the pivot of said lever, as shown in Fig. 14. The form of the lever is also shown in said figure and in Fig. 2, upon referring to which figures it will be seen to consist of an upright portion rising directly from the pivot, then bending forward and downward to form a stop-arm $g'$, which as the lever is thrown forward by means of its forwardly and downwardly extending tail or hand piece is brought into contact with the ratchet-wheel Y and thereby prevented from going farther forward. Riveted or otherwise secured to the rear face of the upright stem or portion of the hand-lever X is a spring $h'$, which, bearing against a pin or stud $i'$ of the shifting frame B$'$, tends to throw the lever and its stop-arm $g'$ away from the ratchet-wheel Y, and consequently to carry the dog $b'$ back over the teeth of said wheel to permit its engagement with a fresh tooth preparatory to another forward movement to turn the roll or platen.

If only a narrow space is desired between lines, the stop-plate Z is moved to such position that its shoulder $e'$ (the one nearest its pivot and nearest roll C) shall stand in the path of pin $f'$. If a wider space is desired, the plate is swung out far enough to remove shoulder $e'$ from and to bring shoulder $d'$ into the path of pin $f'$, or if still wider spacing be desired the plate is swung still farther aside, carrying shoulder $d'$ out of and bringing shoulder $c'$ into the path of pin $f$. To prevent the plate Z from moving beyond the distance necessary to give the adjustments thus stated, a slot $j'$ is made in it to receive a pin or stud $k'$, projecting from the top of shifting frame B$'$, and to retain the stop-plate at the precise adjustment desired it is made thin and elastic, so that it may spring slightly up from frame B$'$, and is furnished with three notches or recesses $l'$, $m'$, and $n'$, Fig. 15, corresponding to the shoulders $c'$ $d'$ $e'$, so that as the plate is moved to one or another position one or another of the notches or recesses shall come directly over a rounded or beveled stud $o'$, rising from frame B$'$, the two entering into engagement and thereby holding the plate against accidental movement. Obviously the arrangement may be reversed, the notches or recesses being made in frame B$'$ and the projection upon the lower face of spring-plate Z. A suitable knob or button is furnished by which to move the plate Z from one position to another. The dog $b'$ is formed with a thumb-piece or extension $b^2$ in rear of its pivot, by which it may be lifted out of engagement with the ratchet-wheel if at any time it be desired to rock the lever X without turning roll or platen C. A spring-detent $p'$, secured to the frame B$'$ and bearing upon ratchet-wheel Y, prevents the roll from being carried by momentum beyond the intended distance.

The shifting carriage B$'$ is held normally at one or the other extreme of its movement upon carriage B by reason of engagement with a shifting bar or rod C$'$, Figs. 1, 2, and 19, which is carried by two elbow-levers D$'$, secured upon a rock-shaft E$'$, carried at its ends by pointed pivots $q'$, Fig. 19, passing through holes in lugs of frame A and secured by set-screws below the top or platform of the latter.

The upright arms of the levers D$'$ pass through holes or slots in the top plate of frame A, and the rock-shaft E$'$ is curved to pass outside and clear of the type-levers F$'$, which latter are elbow-levers grouped about a circular opening in the table or top of the machine, through which they rise and fall as usual.

Riveted or otherwise firmly secured to the under face of the front bar $s$ of shifting frame B$'$ are four beveled blocks G$'$, arranged in pairs, with just enough space between the blocks of each pair to receive the shifting rod or bar C$'$ the inner or opposing faces of the blocks being perpendicular and parallel down to a point somewhat below the axis of rod or bar C$'$, and beveled from said faces downward and outward, as shown in Figs. 2, 13, and 21. The inclined faces are sufficiently extended to insure the bearing of one or the other upon the shifting rod or bar C whenever the carriage is in its normal position, and whether it be in adjustment for printing small letters or capitals, so that if the carriage-frame be turned up the inclined faces bearing upon the rod or bar C' shall bring the shifting carriage exactly to place, the blocks G' passing down upon opposite sides of the rod or bar C', as above explained. Heretofore these blocks have been made quite short and have been supported by arms extending inward from a rod or shaft carrying the front pulleys $v$; but under the present plan of construction the shaft is omitted and short studs or stems substituted, as before mentioned, the blocks being secured to the front bar $s$ of the shifting carriage B'. This arrangement makes the blocks rigid and insures accuracy and certainty of adjustment of the shifting carriage and completely obviates the liability of cramping or binding of the blocks or their getting out of alignment.

For some classes of work it is desirable to have the shifting frame B' held in such position that only capital letters shall print, unless the frame be manually shifted and held to print a small letter or letters; but ordinarily it is desirable to have the shifting frame occupy such position as will cause the small letters to print, except when the frame is manually shifted and held in position for the printing of capitals. Heretofore a spring connected with the shifting bar or rod C' by means of a swinging yoke or equivalent device has been employed to hold the shifting rod and frame B in the desired position, the yoke serving to throw the spring to one or the other side of the pivotal axis of the levers D', which carry the shifting rod or bar C', thereby causing said spring to hold the shifting rod or bar and the shifting frame B' in either of the two positions mentioned. The present construction embodies the same general idea, but materially improves the action of the yoke or shifter and obviates the rapid wear or cutting away of certain parts incident to the former plan.

The improved construction is illustrated in Figs. 2, 19, 20, and 21, in which it will be seen that one of the elbow-levers D' has its horizontal or lateral extension in front of its axis or of the supporting-shaft E', while the other has its horizontal or lateral arm in rear of the axis of said shaft, both levers being weighted in rear of said shaft to counterbalance the weight of the rock-shaft E', so that the shifting rod or bar C' may in itself be as nearly as practicable in a state of equilibrium or devoid of tendency to fall either forward or backward. From the lateral or rearwardly extending arm of the lever D' at one side of the machine, preferably the left, a link or draw-rod $x^3$ passes down to and is connected with a finger-key or lever H', Fig. 1, and from the forwardly-extending arm of the other lever D' a similar link or draw-rod $x^3$ passes to and connects with a finger-key or lever I', also seen in Fig. 1. By depressing the finger-key H' the shifting rod or bar C', and consequently the shifting platen-frame, may be thrown from a forward to a backward position, if not already so adjusted, and, similarly, if in its rearward adjustment it may be moved forward by depressing lever I'.

J' indicates a rocking lever attached to the side of one of the levers D' by a pivot-screw $y^3$ in line with the axis of rock-shaft E' and shifting rod or bar C', as shown in Fig. 21. The lever, which may be conveniently cut from sheet or plate steel or iron, is slotted to permit the passage through it of a stop-screw $z^3$, by which the throw of the lever is limited, the play being sufficient to carry its upper arm $a^4$ to opposite sides of a line passing through the axes of pivot $y$ and rock-shaft E'. Connected with this upper arm $a^4$ of the lever J' is a coiled spring K', the lower end of which is engaged in one or another notch of an upright post or stem L', Fig. 2, secured to the frame A just above the level of the keyboard. By hooking the spring into one or another notch of post L its tension may be varied, as desired.

If it be desired to hold the shifting frame forward, as is required for printing small letters under the usual arrangement of the characters upon the type-levers, the handle of lever J' is depressed, bringing said lever to the position shown in Fig. 2 and causing the spring to act in a plane forward of the axis of shaft E', thereby throwing shifting-bar C' and frame B' forward and retaining them in such position. When so adjusted, the shifting-rod and frame B' may be thrown back without disturbing lever J' by merely depressing key-lever H'. If desired to adjust frame B' and its platen C to print capitals, the lever J' is raised. The spring K' is thereby caused to act in rear of rock-shaft E', and the shifting-rod and platen-frame B' are carried back, but may be moved forward when necessary by depressing key-lever I'. The lever J' works smoothly and easily and is convenient to the operator, its handle extending outward just in front of the upright portion of the main frame A, as shown in Fig. 2. The throw of the shifting rod or bar C' is controlled and limited by slotted plates $x'$ $y'$, clamped upon the platform or top of frame A by clamping-screws, the plates being arranged one within a slot in the other, as shown in Fig. 1, whereby each is kept from shifting laterally.

Figure 15:
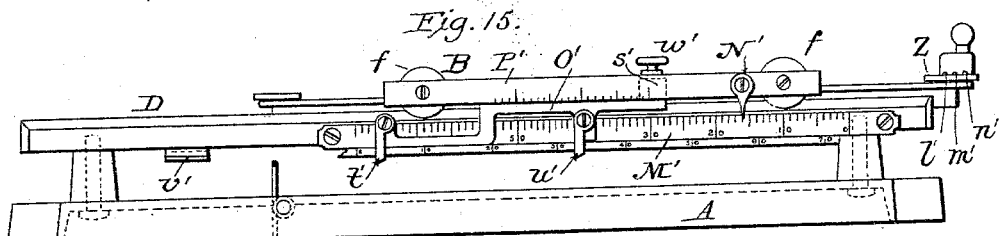

M', Fig. 15, indicates a graduated plate or scale secured to the fixed guide-rod D and corresponding as to its graduation with the scale-plate W of the shifting platen-frame, except that it is numbered from right to left, this scale M' being the same as that heretofore applied to the front edge of the bed or top of frame A and for the same purpose, the pointer N' being attached to the front bar of the carriage B, essentially as heretofore.

As shown in Fig. 1, the front bar of carriage B is provided with a vertical slot $r'$ to receive the upwardly-extending guide-block $s'$ of an adjustable bar O', Fig. 15, to which are attached two pendent stop-blocks $t'$ and $u'$, separated one from another a suitable distance, or one fixed and the other adjustable upon the bar O', as preferred. The purpose of the two blocks is to enable the operator to instantly change the limit of travel of the carriage, which is done by throwing up or down the stop-block $t'$, which block when down engages with a fixed stop $v'$, projecting from guide rod or bar D, but when thrown up passes above the stop $v'$ and permits the second block $u'$ to come into contact with the fixed stop $v'$. This arrangement is very convenient where extracts or quotations are to be introduced, the shortening of the lines serving to distinguish one class of matter from another. It is also of considerable advantage in tabulating and like work, where part of the matter is required to be at one side of a given line and part at the other side. The bar O', which carries the stop-blocks $t'$ $u'$, is clamped at any desired point upon the front bar of carriage B by means of a clamping-screw $w'$, the head or shoulder of which bears upon the top of the carriage-frame and the stem of which enters a threaded hole in block $s'$ of bar O' and draws said bar firmly against the lower face of the frame.

A short scale-plate P', corresponding to one end of scale-plate W, is attached to the front of carriage B and enables the operator to determine the precise points in the travel of the carriage at which the stop-blocks $t'$ and $u'$ shall come into contact with the fixed stop $v'$, the end of the bar O' being used as an indicator or reading-point in connection with scale P'.

Q' indicates a pendulous hammer, the rod or stem of which is carried somewhat above the suspending-pivot and stands directly in the path of the stop-blocks $t'$ and $u'$, so that as the carriage advances the block which is set for operation strikes the upper arm of the stem, carries it forward, and thus raises the hammer, and finally rides off the upper arm and allows the hammer to fall and strike the bell R', which is secured to frame A.

In order to vary the "indentation" of the printed lines—that is, the distance from the edge of sheet at which the line shall begin—an adjustable ring or collar S' is placed upon the hinge-rod E, by which carriage is supported, Figs. 1 and 23, said collar being the same to all intents as that heretofore employed. It is also furnished with a set-screw T', which is, however, pointed instead of blunt, as formerly, in order that it may readily enter one or another of a series of conical holes or recesses $z'$, formed in the rod E at regular intervals, corresponding to a certain number of spaces of the scales W and M', preferably five spaces. By numbering these cavities or a portion of them the operator may instantly determine the proper adjustment of the collar S' and quickly secure it at the precise point desired, the entrance of the pointed screw into the conical sockets drawing the collar accurately to place.

Heretofore the cavities have not been provided and consequently the nice adjustment of the collar to a given point has been difficult.

To facilitate the raising and lowering of the carriage B, it is furnished at its front with a thumb-piece U', which is located at such point between the ends of the carriage that the weight shall be equal on opposite sides of the thumb-piece, thereby overcoming the tendency to twist, as very wide carriages are liable to do when lifted from one corner, as is commonly done when the the thumb-piece is not furnished. It also enables the operator to hold the carriage firmly, and obviates the not unfrequent dropping thereof due to the falling back of the platen-frame when the carriage is quickly lifted.

Figure 8:
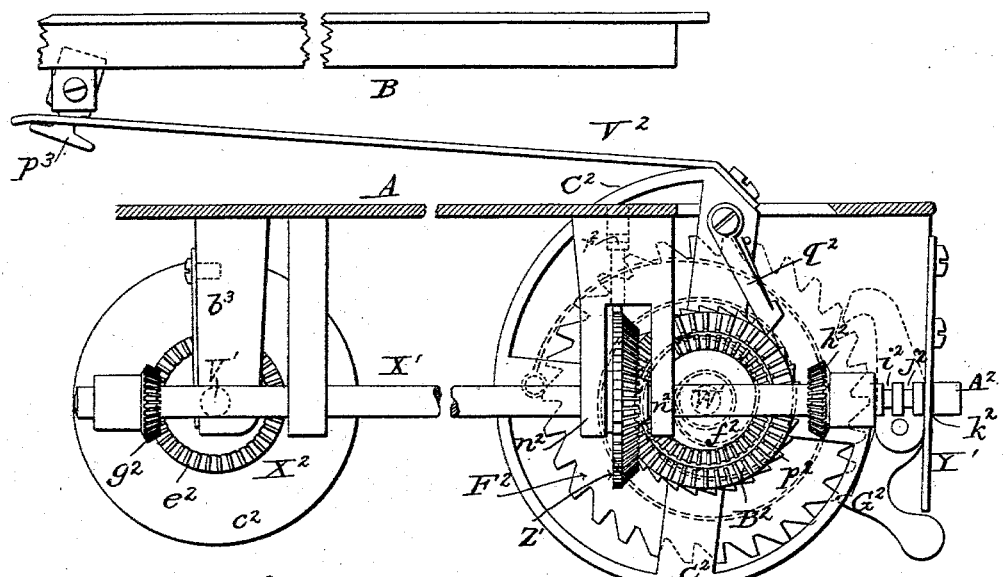
Figure 9:
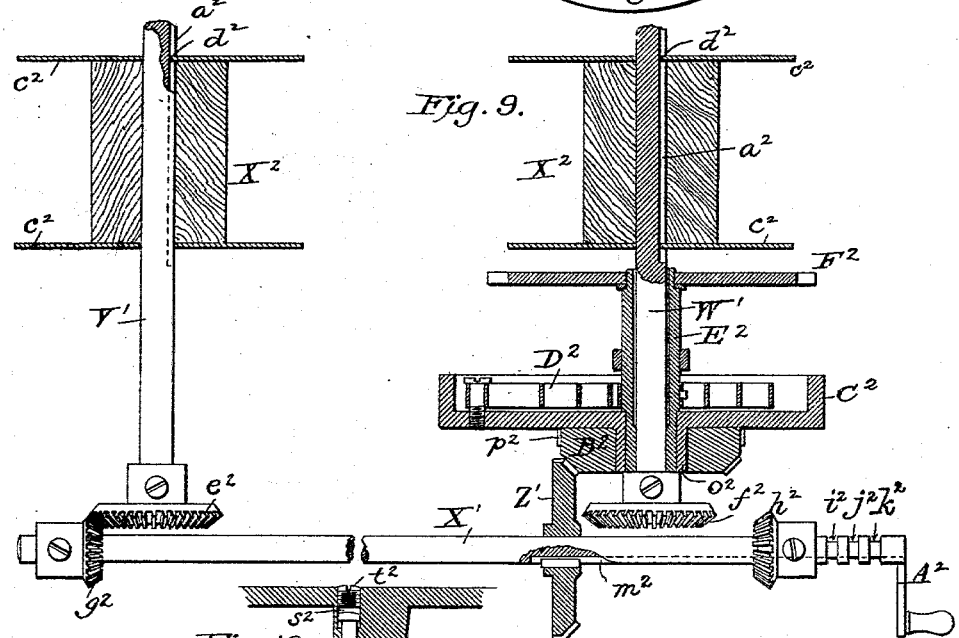

V' and W', Figs. 1, 2, 8, and 9, indicate two shafts, each provided with a longitudinal groove $a^2$ and mounted in hangers $b^3$ of frame A a short distance below the top plate or table of the frame. Mounted upon each of said shafts is a ribbon-spool $X^2$, consisting of a cylindrical body and two heads or disks $c^2$, of sheet metal, stamped or cut with a central eye to receive the shaft and with an inwardly-extending tongue $d^2$ to enter the groove $a^2$ thereof, so that the spools may freely slide upon but may not turn independently of their shafts. Shaft V' carries at its rear end a bevel-pinion $e^2$, and shaft W' carries at its rear end a like pinion $f^2$, as shown in Figs. 8 and 9.

Carried by hangers in rear of but in the same horizontal plane with the shafts V' W' is a shaft X', extending parallel with the line of travel of the carriage or at right angles to the shafts V' W'. Shaft X' carries two small bevel-pinions $g^2$ and $h^2$, which are fixed thereon, the pinion $g^2$ just outside of pinion $e^2$ and pinion $h^2$ just outside of pinion $f^2$; but at such distance apart that when pinion $g^2$ is in mesh with pinion $e^2$ pinion $h^2$ cannot be in mesh with pinion $f^2$, and vice versa. The shaft X' is longitudinally adjustable, so that the engagement of the pinions may be effected and destroyed in whichever order desired. Three circumferential grooves $i^2$, $j^2$, and $k^2$ are formed in shaft X', and a vertically-sliding plate Y', (shown in Figs. 2 and 8,) slotted to straddle the shaft and enter one or another of said grooves, is applied to frame A for the purpose of holding the shaft in position to insure the meshing of pinion $g^2$ or pinion $h^2$ with the companion pinion $e^2$ or $f^2$ or in an intermediate position. The ribbon is wound in reverse directions upon the two spools, and consequently if either be turned in proper direction to wind the ribbon thereon the other spool being free to turn will pay off the ribbon to supply the one being driven or positively turned. Shaft X' is formed with a longitudinal groove $m^2$, and is encircled by a bevel-pinion Z', which is held against movement in the line of its axis by two fixed arms $n^2$, between which it is placed. The pinion Z' is furnished with a tongue which enters the groove $m^2$ of shaft X', and causes the shaft to turn with the pinion, though free to slide through the latter. A small crank or handle $A^2$ is secured upon the shaft X', by which to turn it manually when desired. Motion is given to the pinion Z', always in the same direction, by a pinion $B^2$, which is mounted loosely upon a sleeve or collar $o^2$ of a cam-shaped drum or barrel $C^2$, to the inside of which barrel is attached one end of a spiral spring $D^2$, the other end of said spring being made fast to a sleeve $E^2$, encircling shaft W'. The pinion $B^2$ is formed with circumferential ratchet-teeth $p^2$, with which engages a spring-pressed dog or pawl $q^2$, carried by the drum or barrel $C^2$, said dog riding freely over the teeth while the barrel is turned backward, but engaging therewith and rotating the pinion when the barrel turns forward. The backward rotation of pinion and ratchet Z' is prevented by a gravitating dog or detent $r^2$, Figs. 9 and 10, dropped from above into a hole $s^2$ drilled vertically through the hanger on which the arms $n^2$ are formed, said dog engaging with the circumferential ratchet-teeth of pinion Z'.

Figure 10:
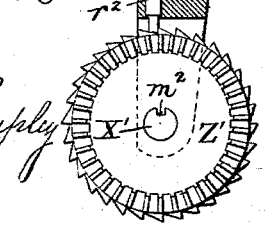

To prevent the dog $r^3$ from falling out when pinion Z' is removed, it is headed, as shown in Fig. 10, the upper end of the hole $s^2$ being enlarged to receive the head, and to prevent escape of the dog through the top of the hole a small plug $t^2$ is screwed in above it. A spring may be inserted between the dog or detent and the plug; but this is not deemed necessary ordinarily. The sleeve or tubular shaft $E^2$ has screwed upon its end a ratchet wheel or disk $F^2$, the thread being in such direction (to the right) that the spring $D^2$ tends to screw the sleeve $E^2$ into it, thereby preventing its accidental detachment. The disk is turned backward to coil the spring and put it under proper tension, as usual, and is held against backward rotation by a double-acting dog $G^2$, similar to the anchor of an "anchor escapement," this device serving when rocked manually to permit a step-by-step backward rotation of the ratchet-disk, and consequently enabling the operator to lessen the tension of the spring gradually and without danger of sudden unwinding.

The purpose of so mounting the ribbon-spools $X^2$ upon their shafts V' and W' that they may be moved longitudinally thereon is to present fresh portions of the ink-ribbon to the type, the continued striking of the type in one place or along one line exhausting the supply of carbonaceous matter or ink contained in the ribbon at said point or along said line.

To insure the proper lateral adjustment of the ribbon and to prevent undue sagging thereof, the spools being shifted independently by hand, I provide ribbon-guides $H^2$, Figs. 1, 2, and 26, each consisting of a wire bent into the form of a yoke, with two parallel sides or branches and a connecting end piece, the latter a little longer than the width of the ribbon. The closed ends of the yokes extend horizontally toward each other over the opening of the top or table of frame A, through which the type rise, and their free or disconnected ends are bent downward at a right angle to the main portion, the two branches of each yoke or guide extending down at opposite ends of one or the other of the spools $X^2$, and their extremities being bent, as shown in Fig. 2, to give a small bearing-point for the heads of the spools to act upon when being moved. The vertical arms of each yoke or guide are clamped in recesses or notches in the edge of a sliding plate $I^2$, which is slotted and held in place on the lower face of the top plate or table of the machine by means of screws $J^2$ passing through the slots of the sliding plate and screwing into the table or top plate from below, as shown in Fig. 2. The sliding plate $I^2$ serves to maintain a proper relation of the arms or branches of the yokes or guides $H^2$ and to support and give stiffness to said guides. The vertical arms of the guides and the ink-ribbon pass through elongated openings $K^2$ in the top plate or table of the frame A, the sliding plates $I^2$ extending slightly past the edges of the openings and the ribbon drawing over the projecting edges of the parts $I^2 L^2 L^2$.

$L^2 L^2$ indicate raised ribs cast upon the top plate or table of frame A, over which the ribbon passes and upon which the yokes or ribbon-guides $H^2$ rest, as shown in Figs. 1 and 2. These ribs are formed with a series of notches in their upper face or edge, and the yokes or guides are made elastic and of such form and proportions that they draw down upon the ribs and seat themselves in the notches and prevent the too free shifting of the guides. The notches also enable the operator to adjust the two guides with accuracy and certainty, thus insuring the straight travel of the ribbon from one spool to the other, and consequently avoiding any tendency to crease or bag the ribbon. The ribbon passes over the end bar of each yoke or guide and is thereby held up near the point at which the type strike.

For the purpose of holding envelopes, cards, and other bodies too short to reach from one band $u$ to the other I provide what is commonly termed an "envelope-holder" $M^2$. This consists of a spring arm or plate $u^3$, attached at its upper end to a supporting-arm $v^3$, curved to conform to the curvature of roll or platen C, and furnished at its free end with a roller $w^3$, which serves to press and hold the envelope, card, or other article against the face of the platen in position to be printed. It is often desirable to adjust the holder $M^2$ toward one or the other end of roller C. Hence I employ a clamping device—such as shown in Figs. 1, 2, and 22—for fastening the supporting-arm $v^2$ to the front bar $s$ of the shifting-carriage. As best shown in Figs. 2 and 22, the lower end of arm $v^2$ is formed with a notch or groove $x^2$ to fit the rounded edge of bar $s$, against which the arm $v^2$ is drawn by a lever or clip $y^2$, pivotally attached to arm $v^2$ and urged at its lower end toward said arm or against the front edge of bar $s$ by a set-screw $z^2$, passing through a threaded hole in the clip $y^2$ above the pivot of the latter and bearing against the arm $v^2$, as shown in Fig. 2. The clip $y^2$ is provided with a series of grooves $x^3$, similar to that of arm $v^2$ and for a like purpose, the series of grooves permitting, however, an adjustment of arm $v^2$ about its point of bearing upon the rear edge of bar $s$ as a center and the clamping of said arm at any desired angle. By thus varying the angle of inclination of arm $v^2$ the distance of roller $w^2$ from the face of roller or platen C may be varied to suit the thickness of different bodies to be printed upon.

For the purpose of varying or adjusting the pressure of roller $w^2$ against platen C or against the envelope, card, or other body to be printed upon, a regulating-screw $N^2$ is passed through a threaded hole in arm $v^2$ and arranged to bear against plate $u^2$ near its point of attachment to arm $v^2$, as shown in Fig. 2. By turning this screw the plate $u^2$ may be urged more or less toward the platen or roll C.

Referring now to Figs. 2, 3, 4, 23, and 24, the construction and arrangement of the key-levers and the links connecting them with the type-bars will be explained.

O indicates a key-lever provided, as usual, with a finger-button at its free end, which button is marked to indicate what type or letter is actuated by the key, there being a series of such levers arranged side by side. Each lever consists of a thin and light strip of wood or metal set with its greatest width in a vertical plane, the forward ends of the several levers being extended upward or downward, as required, to bring their finger-buttons to different levels, as indicated.

At their rear ends the key-levers are all of uniform size and shape, each sloping downward from the top toward the rear extremity and being formed with a semicircular notch $a^3$ to receive or to straddle the lower edge of a rib $c^3$, cast upon frame A and extending from side to side thereof at the rear of the machine and on the under side of the raised hollow base of said frame, as seen in Figs. 1, 2, and 3. Each of said levers crosses and rests upon the space-bar N, which is faced on its upper side with leather, cloth, or other material to lessen noise and wear, and each lever when at rest bears at its upper side against a similarly faced or fashioned bar $P^2$, which limits their ascent. The lateral play of the levers is limited, and they are kept in proper relative positions at their forward ends by means of wires or pins $d^3$, extending downward from bar $P^2$ and passing between the levers, as shown in Figs. 2 and 4, the thickness of the pins determining the extent of their separation at their forward ends. Whenever a letter-key or the space-bar Q is depressed the bar N is carried downward away from the remaining key-levers, and it is therefore necessary to provide means for holding up each key-lever independently of bar N. For this purpose I provide a series of flat springs $e^3$ of the form shown in Figs. 2, 3, and 4—that is to say, bifurcated at their forward ends and bent upward and forward at their rear ends. The forked end of each spring straddles the shank or stem and passes beneath the head of a pin or screw $f^3$, driven into the top of the key-lever to which the spring is applied, and the forwardly-bent rear end is clamped between the under side of the raised base of frame A and a comb-plate $Q^2$, which latter is drawn against said springs with more or less force by means of bolts or screws $g^3$, Figs. 1, 2, and 3. The angle of the spring, formed by bending its rear end forward, is seated in the angle of a recess $R^2$, formed in the base of frame A to receive the springs and the comb-plate, and thus the springs are held against backward movement and the comb-plate prevents forward movement. Hence they are kept exactly in position. By tightening or loosening the screws or bolts $g^3$ the lifting force or effect of the springs may be increased or diminished, as desired, and thus the action of the key-levers made stiffer or easier at will. As the key-levers extend to different distances from their fulcrums, it is advisable to make the springs of different lengths to compensate in a measure for the difference in leverage, and thereby render the action of all as nearly uniform as possible. This result is further insured by connecting the type-bars with the key-levers at different distances from the fulcrum of the latter. The comb-plate $Q^2$ is furnished with thin flat pins or reeds $i^3$, which extend downward between the key-levers in the same manner as the pins $d^3$; but owing to their being quite thin the levers are permitted to stand closer together at their rear ends than at their front ends. In this way the desired spread of the levers is secured and maintained.

Key-levers H' and I', by which the carriage is shifted from lower to upper case or from upper to lower case letters, as the case may be, are cut away above bar N, as shown in Fig. 2, so that they may be depressed without depressing the bar N, and consequently without actuating the letter-spacing mechanism.

The levers H' and I' being thus unsustained by bar N, it is desirable to provide for them some support other than the lifting-spring, and I therefore secure to each of the levers P of the space bar or key Q, near their rear ends, a clip $h^3$, consisting of a piece of metal bent through its middle to form a vertical and a horizontal leaf—the former for attachment to the levers P, as in Fig. 2, and the latter to extend beneath the lever H' or I', as indicated in Fig. 4.

The key-levers O, the levers H' I', and the levers P P are each furnished with a metal strap or stirrup $S^2$, passing beneath the key-lever and upward on each side thereof and terminating above the lever in perforate ears, between which ears is placed the perforated lower end of a draw piece or stem $T^2$, which piece is curved laterally at its upper end and formed with a tubular or perforated boss or block $j^3$, as shown in Figs. 2 and $2^4$. Through the tubular boss $j^3$ is passed the threaded end of a wire or rod $U^2$, which is furnished both above and below the boss with nuts $k^3$, by which its exact adjustment relatively to the draw-piece $T^2$ may be determined and maintained. The upper end of each wire or rod $U^2$ is furnished with a hook $m^3$ to pass through an eye in the short arm of one of the type bars or levers F'. Heretofore it has been customary to merely bend over the end of the wire or rod $U^2$ to form this hook, but in order to give thickness for a good screw-thread the rod is now made heavier than formerly, and its upper end is drilled longitudinally to receive the shank of the hook $m^3$, which is now made of a separate piece of wire of proper size and is retained in the main wire or rod by indenting the sides of the drilled portion and forcing them into the sides of the shank of the hook, as illustrated in Fig. 25. The hook is so bent as to cause it to draw directly in line with the axis of the rod $U^2$. The outward curvature of the draw-pieces $T^2$ causes the rods $U^2$ to more effectually clear the type-bars F' and the basket or guard $W^2$, against and within which they fall, said basket consisting of an elliptical frame of wire, preferably made of two wires $q^3$, one above another, faced on the inside with a leather band $r^3$, stitched to a backing $s^3$ of felt, listing, or the like, which admits of being readily stitched to the wire frame, thus facilitating the application of the leather facing to the basket. Wires $t^3$ serve to sustain the basket in position. The bar $P^2$, which bears the pins $d^3$, is furnished on its lower face with a cushion of rubber, felt, or other material to deaden the sound occasioned by the upstroke of the key-levers, and for the purpose of limiting the depression of the space-bar or key Q it is furnished at or near each end with a hook-shaped hanger $n^3$, each bearing a cushion $o^3$, of rubber or other suitable substance, to form a stop for the levers P P which carry said key. A strap or band $V^2$ connects the carriage B and the spring barrel or drum $C^2$, as usual, the band winding upon the exterior of the drum as the carriage advances. To facilitate attachment and detachment of the band to and from the carriage a T-shaped clip $p^3$ is preferably secured to the carriage, and the end of the band slitted to pass over the same, as illustrated in Fig. 8.

Having thus described my invention, what I claim is—

1. In a type-writing machine, the combination of a main frame, a hinge rod adapted to be partially rotated and having a flattened face, a guide bar at the forward side of the main frame, of V-shape at its upper side, and a paper carriage having a plane-faced roller to rest upon the flattened face of the hinge rod, and V-grooved guiding pulleys to rest upon the front guide bar.

2. In a type-writing machine, the combination of a main frame, a rotary hinge rod at the rear side thereof, a stationary guide bar at the forward side of the frame, a paper carriage provided with a supporting wheel at its rear side to rest upon the hinge rod and with guide wheels at the forward side to rest upon the guide bar; said carriage having perforated ears which encircle but are normally out of contact with the hinge rod, as set forth.

3. In a type-writing machine, the combination of a main frame provided with a front guide rail; a paper carriage provided at the front with two guiding rollers to travel upon said rail, and with perforate ears at the rear; a frame carrying a portion of the spacing mechanism and provided with perforate ears; tubular pivots or bushings extending from the perforate ears of one part into those of the other part; a rotatable hinge rod passing through said tubular pivots and having a flattened face; and a supporting roller carried by the carriage frame and bearing upon the flattened face of the hinge rod, substantially as described and shown, whereby said roller is adapted to support the rear side of the carriage and to hold the tubular bushings out of contact with the hinge rod, and the carriage is adapted to be lifted.

4. In a type-writing machine, the combination of a main frame provided with a stationary guiding rail D at its forward side; a rotatable hinge rod E mounted in said frame and having a flattened upper face; a paper carriage provided with ears $d$, and with roller $c$ to rest upon said hinge rod, and also with guide rollers $f f$, to bear upon the stationary guide rail D; a frame G; and tubular pivots or bushings screwed into the ears $d$ and connecting the frame G and the carriage, substantially as set forth.

5. In a type-writing machine, the combination of a paper carriage, a frame pivotally connected therewith and adapted to rise and fall vertically, a block pivoted in said frame, adapted to swing in the direction of travel of the carriage, and provided with a dog, and a toothed rack for the dog to engage with.

6. In a type-writing machine, the combination of a vibratory rack-bar, a carriage guided at the front, a gravitating block carried by said carriage, and two dogs carried by the block and arranged to enter alternately into engagement with the rack-bar, one of said dogs being rigid and the other yielding, substantially as explained.

7. In a type-writing machine, the combination with a frame, of a vibratory rack-bar, a carriage, a gravitating block carried by said carriage and adapted to swing a limited distance, a rigid dog carried by said block, and a yielding dog pivoted in said block, said dogs being arranged one behind the other and adapted to engage alternately with the rack-bar as the latter is vibrated.

8. In a type-writing machine, the combination of a frame, a vibratory rack-bar mounted in said frame,—a carriage, a vertically-movable frame carried thereby,—a block pivoted in said frame,—a rigid dog secured to said block, and a yielding dog pivoted in said block,—the parts being constructed and arranged to operate substantially as set forth.

9. The herein described spacing mechanism consisting of vibratory rack-bar J, tipping frame G,—block R pivoted in said frame,—and yielding dog H and rigid dog I carried by said block.

10. In a typewriter, the combination with vibratory rack-bar J of frame G having recessed face and narrow bearing surface $l$, and block R pivoted in said frame and provided with dogs H and I.

11. In a type-writing machine, the combination with vibratory rack J, of frame G, block R, pivoted therein and provided with narrow bearing face $l$, rigid dog I secured to, and yielding dog H pivoted in said block and adapted to bear against said face $l$.

12. In a type-writing machine, the combination with a vibratory rack-bar, of a pivoted frame G, block R pivoted in said frame, rigid dog I secured to said block,—yielding dog H pivoted to said block,—spring $m$ interposed between the block and dog H, and screw $n$ for limiting the throw or movement of said dog.

13. In combination with a paper carriage which is guided at the front, and with spacing dogs carried thereby, a vibratory rack-bar movable from the path of one of said dogs into the path of the other, a series of key-levers of the second order, and a cross bar connected with the rackbar and extending beneath the key-levers, whereby said levers are caused to vibrate the rackbar and actuate the spacing devices.

14. In a type-writing machine, the combination of a main frame; a rigid guide bar at the forward side thereof; a rotary hinge rod at the rear side thereof; a carriage having eyes to encircle the hinge rod, a supporting roller to travel thereon and guiding rollers to traverse the front guide bar; tubular bushings inserted in the eyes of the carriage, a frame pivoted upon said bushings, a block pivoted in said frame and provided with yielding and rigid dogs, and a vibratory rack-bar adapted to move from the path of one dog into that of the other, all substantially as shown and described.

15. In combination with key-levers O, rigid plate $Q^2$ provided with thin reeds or strips extending between the levers near their rear ends, and comb plate $P^2$ provided with thicker stems or wires which extend between the key-levers near their forward ends, substantially as and for the purpose explained.

16. In combination with a supporting frame and a carriage movable over the same, a supplemental carriage movable transversely upon the main carriage and provided with a platen roll, said supplemental carriage being formed with a rigid front bar; and having beveled blocks secured to the lower face of said front bar to receive a shifting bar by which to shift the supplemental carriage.

17. In combination with main frame A and carriage B supplemental carriage B′ provided with platen C, and having beveled blocks G′ secured directly to the lower face of its front bar, and shifting bar C′ extending into the space between said blocks.

18. In a type-writing machine, the combination of main frame A, carriage B, supplemental carriage B′, beveled blocks G′ secured directly to the frame of said supplemental carriage, rock-shaft E′, levers D′ mounted upon said shaft and carrying shifting rail C′, and key-levers connected with the levers D′ on opposite sides of their axes and serving to throw the shifting rod forward or backward, as required.

19. In combination with shifting carriage B′, lever D′ and rod C′, lever J′ pivoted to lever D′, a stop to limit the movement of lever J′, and a spring attached to said lever J′ and adapted to be carried by the movement of said lever to one or the other side of the axis of lever D′, as set forth.

20. In a type-writing machine, the combination of a shifting paper carriage, a series of type-bars each carrying two type to strike the paper upon said carriage, a shifting rod engaging with and serving to shift said carriage to bring the paper properly over one or the other set of type, supporting levers carrying said shifting-rod, a shifting lever pivoted to one of said supporting levers, and a spring attached to the shifting-lever and adapted to be carried thereby to either side of the axis of the supporting levers.

21. The combination substantially as set forth, of roll or platen C, a supporting frame therefor, a roll $w$ in rear of the platen carried in open hangers and provided with pulleys $v$, studs $x$ secured at one end to the platen frame, pulleys $v$ mounted loosely upon said studs, bands $u$ passing about the pulleys and beneath the platen C, and shields $z$ extending beneath the bands and having upturned lips extending to and alongside the front pulleys $v$ to prevent displacement of said pulleys.

22. In combination with roll or platen C, pulleys $v$, and bands passing about said pulleys and beneath the roll, a scale W, and supporting arms therefor, the scale being bent or fashioned substantially as shown to lie close to the face of the roll C, but to pass wholly outside of the bands $u$.

23. In combination with roll C and frame therefor, bands $u$ passing beneath roller C, and a scale W, carried by arms attached to said frame, the scale having its ends bent downward and outward to pass beneath the bands $u$, substantially as described and shown.

24. In combination with a frame provided with a fixed stop, a carriage movable upon said frame and provided with two dogs or stops, the forward one adapted to be swung at will into or out of line with the fixed stop of the frame.

25. In combination with a main frame and a fixed stop, a carriage movable over said frame, a bar adjustably secured to said carriage, and two dogs attached to said bar, the forward one being adapted to swing into and out of line with the fixed stop.

26. In combination with a type-writer frame and a fixed stop; a carriage; a bar adjustably secured to said carriage; a dog or detent carried by said bar; and a scale extending along the meeting line of the bar and the carriage, whereby the extent of adjustment of the bar relatively to the carriage may be nicely determined.

27. In combination with a main frame provided with a fixed stop, a traveling carriage movable over said frame and having a slot in its frame, a bar provided with a block to enter said slot, a clamping screw to hold said block at any point in the slot, and a dog or detent carried by the bar and adapted to engage with the fixed stop.

28. In combination with a longitudinally-movable ribbon spool, a ribbon guide consisting of the sliding plate, and a wire carried by said plate, bent horizontally over the plate to carry the ribbon, and having its free ends extended downward to bear against opposite ends of the spool, substantially as set forth.

29. In combination with a main frame, shafts or rods $V'$, $W'$, spools $X^2$, slides $I^2$, and ribbon guides $H^2$ attached to said slides and having their free ends extended downward opposite the ends of the spools.

30. In a type-writing machine, the combination of a frame provided with a bell and a fixed stop, a carriage movable thereon, a scale plate applied to the front of said carriage, and a slide carried by said carriage, adjustable thereon, and provided with a dog to actuate the bell and to engage with the fixed stop.

31. In combination with shafts $V'$, $W'$, provided with spools $X^2$ and pinions $e^2$, $f^2$; shaft $X'$ provided with pinions $g^2$, $h^2$, and $Z'$, and arranged to slide longitudinally through the latter; sleeve $E^2$ encircling shaft $W'$; drum $C^2$ mounted upon said sleeve; pinion $B^2$ loosely encircling a boss or hub of the drum; and a pawl or dog carried by the drum and arranged to engage with ratchet teeth formed upon said pinion $B^2$.

32. In combination with shaft $W'$, sleeve $E^2$, drum $C^2$, provided with pawl $q^2$, spring $D^2$ and pinion $B^2$ loosely mounted upon a hub or boss of the drum, grooved shaft $X'$, pinion $Z'$ mounted upon said shaft, and gravitating dog $r^2$ seated in a socket above pinion $Z'$.

In witness whereof I hereunto set my hand in the presence of two witnesses.

WILLIAM McKENDREE JENNE.

Witnesses:
THOS. RICHARDSON,
A. D. RICHARDSON.